United States Patent [19]
Redman et al.

[11] Patent Number: 5,074,176
[45] Date of Patent: Dec. 24, 1991

[54] THREADING MACHINE CHUCK

[75] Inventors: James C. Redman; Michael R. Sanner, both of Amherst; Paul W. Gress, Bay Village, all of Ohio

[73] Assignee: Emerson Electric Co., St. Louis, Mo.

[21] Appl. No.: 640,256

[22] Filed: Jan. 10, 1991

Related U.S. Application Data

[63] Continuation-in-part of Ser. No. 460,738, Jan. 4, 1990, abandoned.

[51] Int. Cl.$^5$ ............................................. B23B 5/22
[52] U.S. Cl. ................................. 82/165; 279/1 L; 279/33
[58] Field of Search ................. 279/35, 36, 105, 106, 279/1 C, 1 H, 1 SG, 1 L, 1 DL, 33, 107; 82/165, 166, 167; 81/57.15, 57.18, 59.1, 90.2

[56] References Cited

U.S. PATENT DOCUMENTS

| | | | |
|---|---|---|---|
| 2,444,457 | 7/1948 | Marks et al. | 279/35 |
| 2,890,888 | 6/1959 | Damijonaitis | 279/35 |
| 2,980,434 | 4/1961 | Hoffman | 279/106 |
| 3,413,667 | 12/1968 | Behnke | 10/89 |
| 4,688,453 | 8/1987 | Schulze-Beckinghausen | 81/57.18 |
| 4,819,274 | 4/1989 | Redman | 82/165 |

Primary Examiner—Larry I. Schwartz
Assistant Examiner—Julie R. Daulton
Attorney, Agent, or Firm—Body, Vickers & Daniels

[57] ABSTRACT

A rotatable chuck for supporting a plastic coated workpiece in a power driven threading machine is disclosed comprising workpiece engaging jaws mounted on the machine spindle for rotation therewith and for pivotal movement relative thereto radially inwardly and outwardly of the spindle axis. Each jaw pivotally supports an insert holder provided with a pair of inserts for engaging the outer surface of the workpiece. Each of the insert holders pivotally supports a centering link associated with an adjacent jaw so as to be actuated in response to pivotal displacement of the jaws radially inwardly of the spindle axis to control the attitude of the insert holders so that the inserts are directed radially inwardly of the spindle axis to assure a uniform gripping action by the two inserts of each holder upon engagement with the workpiece. The centering links also displace the workpiece to a centered position coaxial with the spindle axis during inward displacement of the jaws.

39 Claims, 9 Drawing Sheets

THREADING MACHINE CHUCK

This application is a continuation-in-part of application Ser. No. 460,738, filed Jan. 4, 1990, abandoned.

BACKGROUND OF THE INVENTION

The present invention relates to the art of power driven threading machines and, more particularly, to chucks for gripping a plastic coated workpiece and rotating the workpiece during cutting, reaming and/or threading thereof.

Power driven thread cutting machines are well known and basically comprise a rotatable chuck assembly for supporting and rotating a workpiece, a tool carriage supporting tools for performing work on the rotating workpiece, and a drive unit for rotating the chuck assembly and thus the workpiece. The chuck assembly generally includes a tubular spindle having an axis of rotation and axially opposite ends, and a plurality of workpiece engaging jaws pivotally supported at the opposite ends of the spindle for displacement radially inwardly and outwardly of the spindle axis between closed and open positions with respect to a workpiece introduced through the spindle. The jaws on the spindle provide for a workpiece to be gripped at axially spaced apart locations along the length thereof, and in the closed positions of the jaws the workpiece is held in a centered position coaxial with the spindle. The spindle and jaws are rotatable as a unit to rotate the workpiece relative to the tool carriage which usually carries a cutting tool, a reaming tool and a thread cutting die head. When the jaws are in the open positions thereof, the workpiece is released and is adapted to rest on the inner periphery of the tubular spindle. The spindle diameter is such that the chuck assembly is adapted to grip and support workpieces having different diameters up to a given maximum diameter which is less than the inner diameter of the spindle. A drive unit is provided for the chuck assembly and, in connection with initiating operation of the threading machine, the jaws are generally pivoted relative to the spindle and into engagement with a workpiece positioned in the spindle, after which the workpiece and chuck assembly are driven together by the drive unit through the jaws. Upon completion of the cutting, reaming and/or threading operation, the direction of the drive is reversed, whereby the jaws pivot outwardly of the spindle axis to release the workpiece.

Typically, the workpiece engaging portions of the jaws of such chucks are serrated to promote gripping interengagement with the workpiece so as to prevent slippage of the workpiece relative to the chuck assembly during a threading operation. Such serrated workpiece engaging jaws are shown, for example, in U.S. Pat. Nos. 2,890,888 to Damijonaitis; 2,980,434 to Hoffman; and, 3,413,667 to Behnke. As will be seen from the latter prior art, three or four such serrated jaw members are equally spaced apart circumferentially of the chuck axis and, upon gripping interengagement with the workpiece, the teeth penetrate the surface of the workpiece sufficiently to preclude slippage of the workpiece relative thereto during the performance of threading or other work on the workpiece. While such jaw configurations work satisfactorily in connection with gripping and rotating a metal workpiece, a number of problems are encountered in connection with efforts to use such jaw configurations to grip and rotate a plastic coated workpiece, such as a plastic coated pipe for example. Construction codes in many locations require the use of plastic coated pipe, when pipe is buried under ground, to protect the metal pipe from deterioration. Such a plastic coating on metal pipe is typically about 1/16" thick, and the plastic materials differ in degrees of hardness and are applied about the pipe by different methods which accordingly provide different bonding strengths between the pipe and coating. In connection with efforts to grip and rotate a plastic coated pipe through the use of workpiece gripping jaws heretofore known, it has been necessary to penetrate the plastic coating in order for the teeth of the jaws to grip the metal pipe to preclude slippage of the workpiece relative to the jaws during a cutting, reaming and/or threading operation. More particularly in this respect, the gripping jaw arrangements heretofore provided have a small area of contact with the outer surface of the workpiece and the plastic does not have sufficient strength to withstand the torsional load on the plastic coating during working. Therefore, the pipe slips relative to the gripping jaws and the jaws groove the plastic circumferentially all the way down to the outer surface of the metal pipe therebeneath. If the bond between the plastic and metal pipe is weak, partial penetration of the plastic in a small area of contact with the jaws can result in the plastic being torn from the pipe. Obviously, neither of these conditions is acceptable and require either repair of the plastic or replacement of the pipe being worked upon, both of which are costly from the standpoint of material and time. While such destruction of the plastic coating can be avoided by full penetration of the teeth of the gripping jaws into the metal of the pipe, such full penetration exposes the pipe and this is not acceptable by code and requires repair of the pipe prior to its use to close the openings caused by such penetration. This again is time consuming and expensive. Moreover, even if the teeth of the workpiece gripping jaws are of a sufficient length to fully penetrate the plastic coating, there is the possibility that the undesirable slippage and destruction of the plastic will occur upon driving engagement of the jaws with the plastic coating before full penetration is achieved.

SUMMARY OF THE INVENTION

In accordance with the present invention, an improved workpiece gripping and rotating chuck is provided which is especially suited for use with plastic coated workpieces and by which the foregoing and other disadvantages of chucks heretofore provided are either minimized or overcome. More particularly in this respect, a chuck in accordance with the present invention is comprised of a plurality of jaws pivotally supported at the front end of the spindle, which is the end adjacent to the end of a workpiece to be machined, and each of the jaws is provided with a workpiece engaging member which is supported thereon for pivotal movement about an axis parallel to the pivot axis of the jaw and the axis of the spindle. The jaws are equally spaced apart about the axis of the spindle and are driven to pivot radially inwardly and outwardly of the spindle axis between open and closed positions relative to a workpiece positioned in the spindle. The workpiece engaging member on each jaw has an inner end facing the spindle axis for engaging the outer surface of the plastic coated workpiece and which end has a relatively large workpiece engaging surface area. Preferably, the inner end is profiled to indent or penetrate the plastic to promote gripping thereof, but without penetration to the underlying metal pipe. Displacement of the workpiece engaging members relative to their pivot axes is controlled during closing movement of the jaws so as to maintain the inner end of each workpiece engaging member on a radial path relative to the spindle axis. This assures the desired orientation of the inner end of the workpiece engaging member relative to the outer surface of the workpiece upon interengagement therebetween. The pivotal relationship between the workpiece engaging member and jaw provides for the workpiece engaging member to be self-centering whereby, upon interengagement with the outer surface of the plastic coating on the workpiece, the workpiece engaging area of the inner end of the workpiece engaging member uniformly engages the outer surface of the plastic. The relatively large surface area on the inner end of the workpiece engaging member optimizes radial gripping of the workpiece and frictional interengagement with the plastic coating on the workpiece to avoid slippage. Further, the location of the pivot axis between the workpiece engaging member and jaw optimizes the application of the gripping force radially inwardly of the spindle axis and uniformly with respect to the area of engagement, thus further promoting gripping of the workpiece without slippage of the latter during a threading operation.

When the jaws are in the closed positions relative to a workpiece, the workpiece is driven directly by the jaw members through the workpiece engaging members, thus optimizing the application of radial gripping forces on the workpiece. In addition to controlling the attitude of the workpiece engaging members during closing movement of the jaws, the chuck advantageously provides for engaging and elevating a workpiece initially resting on the bottom of the machine spindle to a position in which the workpiece is coaxial with the spindle axis when the jaws are in the closed position. This advantageously avoids the necessity of having to manually position the workpiece coaxial with the spindle during closure of the jaws.

Preferably, each of the workpiece engaging members includes a pair of inserts pivotal about corresponding axes parallel to the spindle axis and having shallow toothed inner surfaces facing the spindle axis to provide the workpiece engaging inner end of the workpiece engaging member. The pivotal relationship between the inserts and the body provide a further self-centering function to optimize uniform interengagement and thus transfer of gripping forces radially of the workpiece. The pivotal inserts also enable the chuck to accommodate workpieces of different diameter which, otherwise, would require a different workpiece engaging profile on the inner end of the workpiece engaging member for each different diameter of workpiece in order to get the same area of contact and force application. In accordance with the preferred embodiment, the chuck can accommodate plastic coated pipe ranging in size from ½ inch to 2 inches in diameter.

It is accordingly an outstanding object of the present invention to provide improvements in connection with threading machine workpiece supporting and rotating chucks of the character including a plurality of pivotal jaws for releasably engaging and rotating a workpiece to be machined.

Another object is the provision of a chuck of the foregoing character in which the jaws are particularly suited for engaging and rotating a plastic coated workpiece.

Yet another object is the provision of a chuck of the foregoing character wherein the jaw members are structured and structurally interrelated to engage and rotate a plastic coated workpiece without separating and/or stripping the plastic coating from the workpiece.

Still another object is the provision of a chuck assembly of the foregoing character in which the jaws are structured and structurally interrelated to optimize the area of interengagement between workpiece engaging members on the jaw and the outer surface of a plastic coated workpiece.

A further object is the provision of a chuck of the foregoing character wherein the jaws are structured and structurally interrelated to orient the workpiece engaging ends of the workpiece engaging members such that the workpiece engaging ends radially approach and engage the outer surface of the workpiece during closing movement of the jaws.

Yet a further object is the provision of a chuck of the foregoing character wherein the workpiece engaging members are self-centering relative to the outer surface of the workpiece upon engagement therewith.

Still another object is the provision of a chuck of the foregoing character wherein the jaws are structured and structurally interrelated to center a workpiece relative to the machine spindle axis in response to displacement of the jaws towards gripping relationship with the workpiece.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawing in which.

DESCRIPTION OF PREFERRED EMBODIMENTS

The preferred embodiments of the invention are illustrated and described herein in connection with a power driven threading machine similar to that shown in U.S. Pat. No. 4,819,527 to Redman, assigned to the same assignee as the present application, and the disclosure of which patent is incorporated herein by reference. As will be seen from the latter patent and from FIG. 1 herein, the power driven threading machine includes a chuck C, to be described in detail hereinafter, rotatably supported by a spindle housing SH which is mounted on the upper end of a transmission housing TH which in turn is supported on a machine frame or base B which is only partially shown in FIG. 1. Chuck C includes a tubular spindle S rotatably supported in spindle housing SH and provided at its front and rear ends with front and rear jaw units FJ and RJ, respectively, which are rotatable with the spindle and adapted to grippingly engage, support and rotate a workpiece W such as a plastic coated pipe to be threaded. For this purpose, and as will become more apparent hereinafter, spindle S supports a jaw actuating and chuck drive collar DC which is adapted to be driven such as by a sprocket chain SC which, in turn, is driven by a motor M and, preferably, through a multi-speed transmission T disposed in transmission housing TH.

Figure 1:
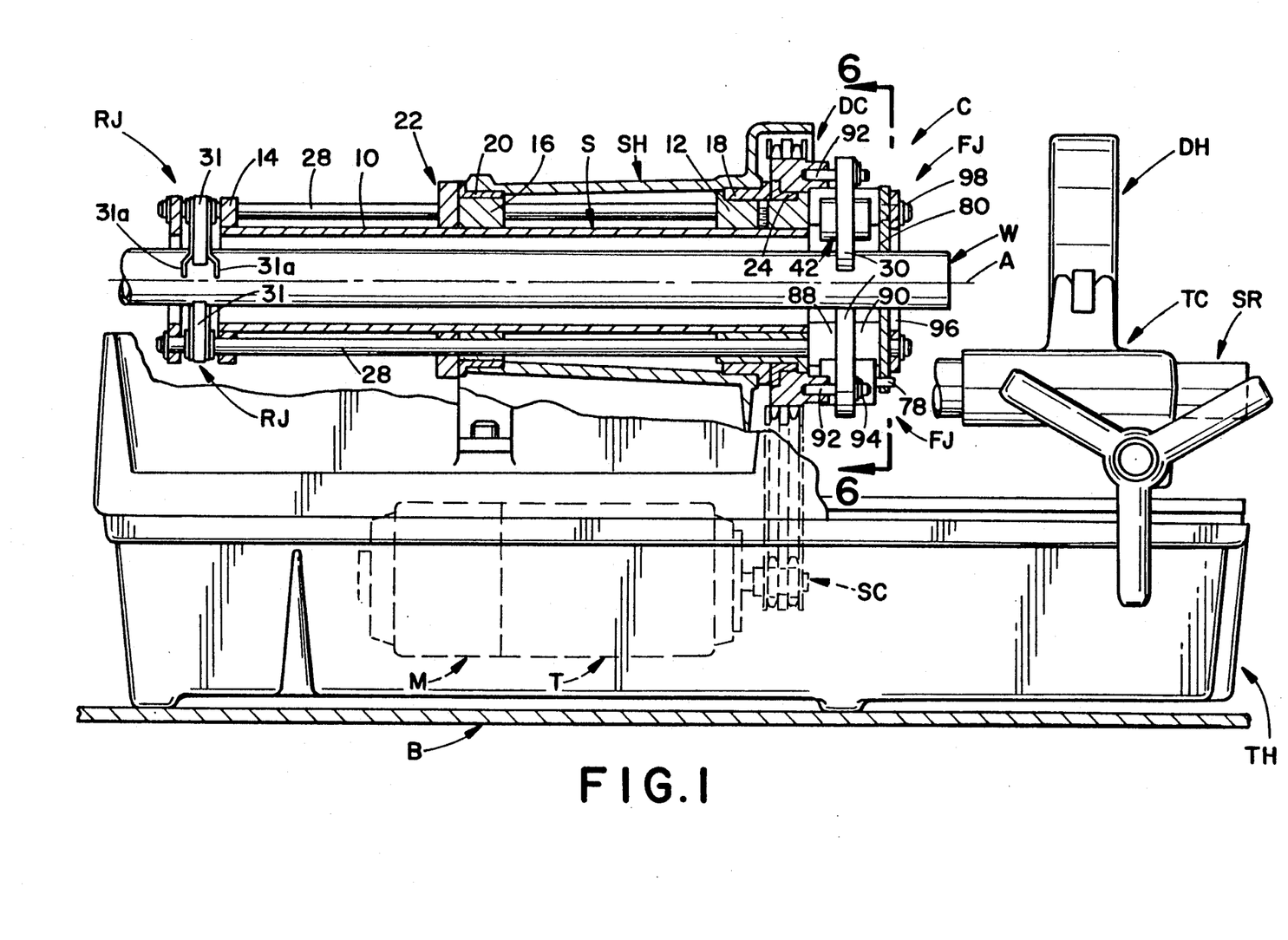
FIG. 1 is a side elevation view, partially in section, of a power driven threading machine provided with a chuck according to the present invention.
Figure 2:
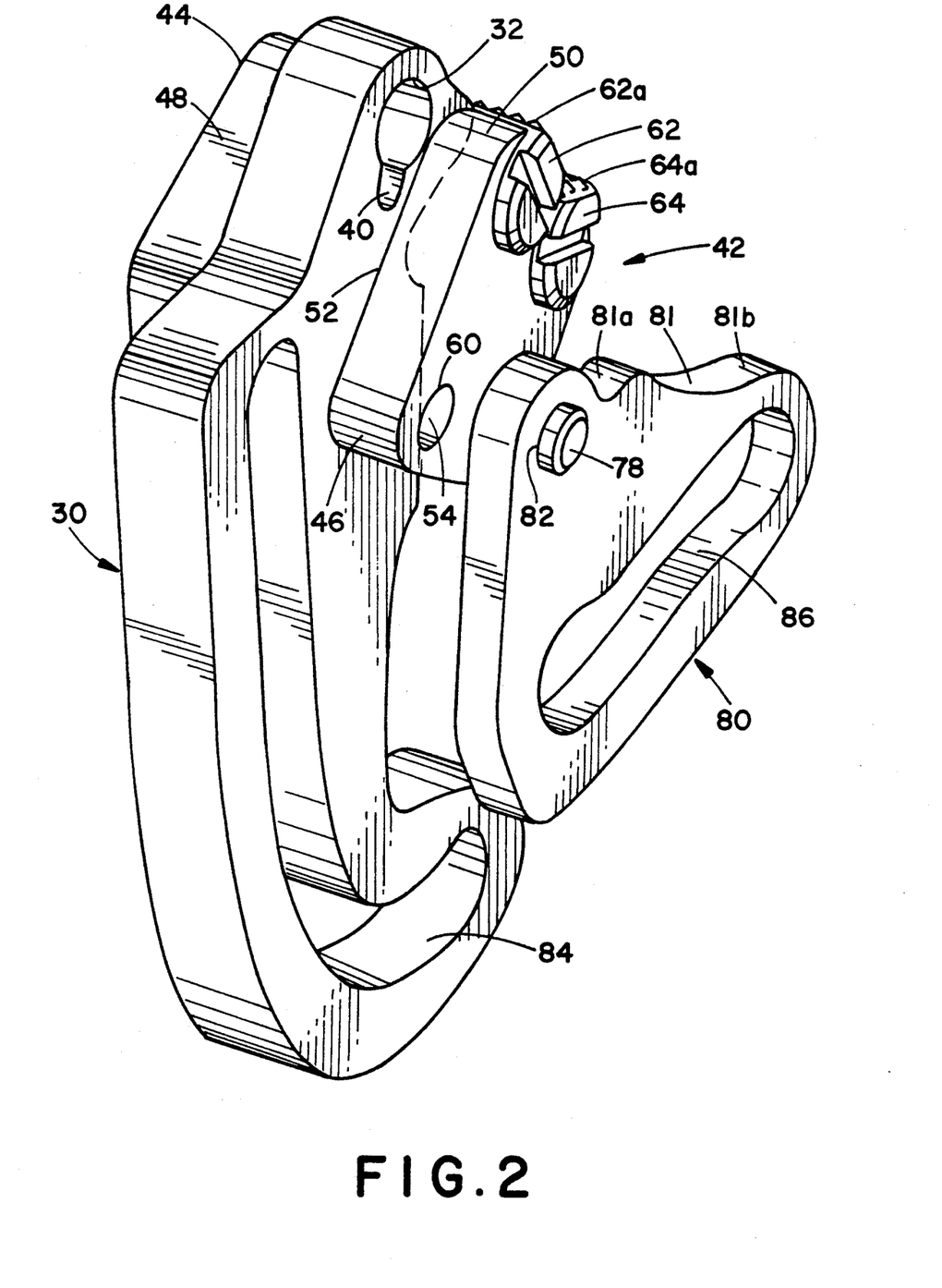
FIG. 2 is a perspective view of the components of a jaw unit of the chuck.
Figure 3:
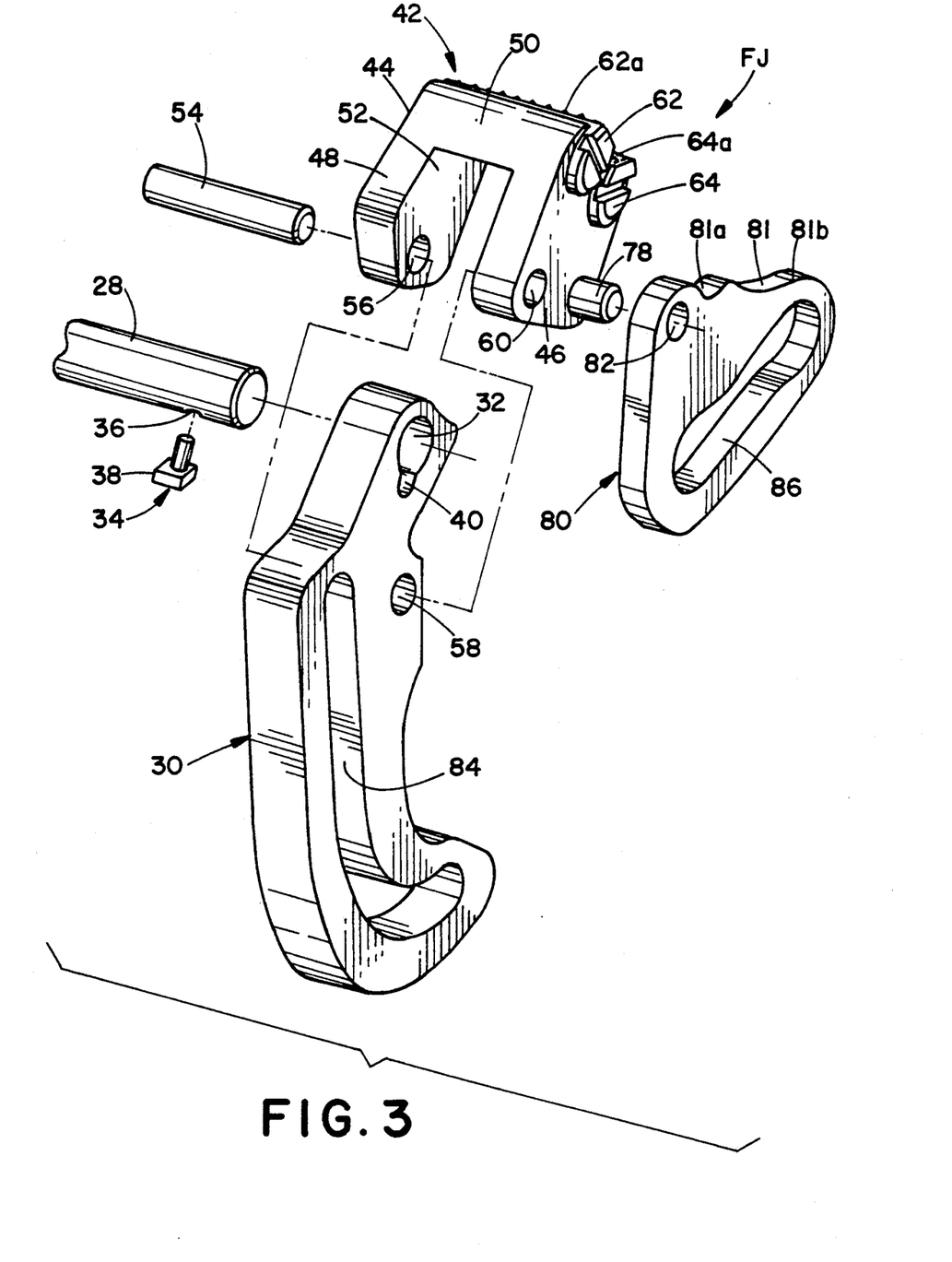
FIG. 3 is an exploded perspective view of the components of the jaw unit.

Spindle housing SH is provided along its laterally opposite sides with tubular openings receiving corresponding support rods SR, only one of which can be seen in FIG. 1 and which, in a well known manner, are adapted to support a tool carriage TC which carries a thread cutting die head unit DH. As is well known, tool carriage TC is adapted to be moved axially along support rods SR toward and away from the front end of the chuck and the corresponding end of workpiece W, and die head DH is adapted to thread the workpiece end during rotation of the chuck and thus the workpiece about the chuck or machine axis A with which the die head is coaxially positioned. While not shown, it will be appreciated that tool carriage TC may also support additional tools for performing work such as cutting and reaming operations on workpiece W.

Spindle S is comprised of a spindle tube 10 coaxial with chuck axis A and having a front end 10a and a rear end 10b. Front end 10a is provided with an annular collar 12 suitably secured thereto for rotation therewith, and rear end 10b is provided with a collar 14 suitably secured hereto for rotation therewith. A collar 16 surrounds tube 10 intermediate the opposite ends thereof and is suitably secured to the tube for rotation therewith. Spindle tube 10 is supported for rotation in spindle housing SH by means of a pair of annular bearings 18 and 20 interposed between the spindle housing and collars 12 and 16, respectively. A spindle retainer and drag brake arrangement 22 is provided on the rear side of collar 16, as shown and for the purpose set forth in U.S. Pat. No. 4,819,527. Drive collar DC is an annular plate member surrounding collar 12 and supported thereon for rotation relative to the collar and thus spindle tube 10 by means of an annular bearing member 24.

The outer periphery of the drive collar is provided with sprocket teeth 26 to accommodate sprocket chain SC by which the chuck assembly is driven as set forth hereinafter.

Collars 12, 16 and 14 are provided with axially extending openings, not designated numerically, which rotatably receive and support a corresponding jaw rod 28. Each rod 28 is pivotal about a corresponding rod axis parallel to chuck axis A, and the axially opposite ends of each rod extend outwardly beyond the corresponding end of spindle tube 10. Rods 28 are equally spaced apart about axis A, and the front end of each rod supports a corresponding one of the jaw members 30 of front jaw units FJ while the rear ends support a corresponding one of the jaw members 31 of rear jaw units RJ, both of which front and rear jaw members are rotatable with the corresponding rod 28. The rear jaw units include centering fingers 31a, and the jaw members 31 and centering fingers 31a can be structured and interconnected with rods 28 and shown and described in the aforementioned U.S. Pat. No. 4,819,527.

With reference in particular to FIGS. 2–6 of the drawing, each front jaw unit FJ comprises a jaw including a jaw member 30 having an opening 32 therethrough receiving the corresponding end of rod 28. Jaw member 30 is interconnected with rod 28 against rotational displacement relative thereto by means of a pin 34 extending through an opening 36 therefor in rod 28 and having a head 38 engaging in a slot 40 opening into opening 32 of jaw member 30. Each jaw further includes a workpiece engaging member 42 comprising a U-shaped holder 44 having legs 46 and 48 and a bridging portion 50 therebetween providing a recess 52 receiving the corresponding jaw member 30. Workpiece engaging member 42 is pivotally interconnected with jaw member 30 by means of a pin 54 which extends through openings 56, 58 and 60 respectively provided therefore in holder leg 48, jaw member 30 and holder leg 46. Bridging portion 50 provides the workpiece engaging end for the workpiece engaging member and, in the present embodiment, is provided with a pair of inserts 62 and 64 having corresponding toothed outer surfaces 62a and 64a for engaging the outer surface of a workpiece as set forth more fully hereinafter. Each of the inserts 62 and 64 has a circular outer surface and is axially received in and pivotally supported by a corresponding circular channel 66 provided therefor in bridging portion 50. Each of the inserts 62 and 64 extends axially outwardly of the corresponding channel 66 for the purpose set forth hereinafter, and each of the inserts is axially retained in channel 66 by means of a corresponding spring biased plunger assembly 68 having a plunger 70 which engages in a flat 72 in the corresponding insert to releasably hold each insert in a neutral position. Each plunger assembly 68 is captured in a corresponding chamber 74 in leg 48 of holder member 44 and includes a spring 76 engaging in the chamber behind plunger 70 so as to bias the latter into engagement with the corresponding insert flat. Each of the inserts is rotatable in the corresponding channel 66 against the bias of the corresponding spring 76, and the axes of chambers 74 converge in the direction towards the bridging portion 50 such that end faces 62a and 64a of the inserts are at an angle to one another and oriented radially with respect to axis A.

Each of the workpiece engaging members 42 further includes a pin 78 projecting outwardly from leg 46 in the direction which is axially outwardly of the front end of the threading machine when the jaw units are assembled thereon. The axes of pins 54 and 78, the axis of inserts 62 and 64 and the axis of rod 28 are all parallel to one another and to spindle axis A. Each jaw unit FJ further includes a centering link member 80 having an opening 82 therethrough receiving pin 78 so that the link is pivotal relative to workpiece engaging member 42. Jaw member 30 has an elongate cam slot 84, and centering link 80 has an elongate cam slot 86, the functions of which will become more apparent hereinafter. When jaw units FJ are assembled on the front end or the threading machine, as best seen in FIG. 1, each of the jaw members 30 is received on a corresponding one of the rods 28 with spacer sleeves 88 and 90 on axially opposite sides of the jaw member and respectively engaging against collar 12 on the axially inner side thereof and one of the centering links 80 on the axially outer side thereof. As will be appreciated from FIG. 6, when the front jaw units FJ are assembled on rods 28, the cam slot 86 of the corresponding centering link member 80 receives rod 28 of the next adjacent jaw unit in the counterclockwise direction in FIG. 6. As will be further seen from FIGS. 1 and 6 of the drawing, cam slot 84 of each of the jaw members 30 receives a corresponding jaw drive pin 92 mounted on and extending axially forwardly from drive collar DC for displacement with the drive collar about axis A. Pins 92 and cam slots 84 cooperate to drive the corresponding jaw member 30 about the axis of the corresponding rod 28 as described hereinafter, and stability against relative axial displacement between each drive pin 92 and the corresponding jaw member during driving of the jaw member and driving of the chuck assembly thereby is provided by a spring clip member 94 on the axially outer end of pin 92. Each centering link member 80 has an inner edge 81 radially facing axis A and having opposite ends 81a and 81b. End 81a is in the form of a shoulder adjacent the corresponding pin 78, and end 81b is adjacent the opposite end of the link. Inserts 62 and 64 extend outwardly of the corresponding holder 44 across ends 81a and 81b. The purpose of edge 81 and ends 81a and 81b thereof is set forth hereinafter. The jaw units are axially retained on rods 28 by means of an annular retainer plate 96 having openings through which rods 28 extend. While plate 96 is not shown in FIG. 6 of the drawing, it will be appreciated therefrom and from FIG. 1 that plate 96 circumferentially interconnects the outer ends of rods 28 to provide stability thereof against bending when the jaws engage and drive a workpiece. The jaw members 30, spacer sleeves 88 and 90, centering link 80 and retainer plate 96 are maintained in axially assembled relationship relative to the corresponding end of spindle tube 10 by means of spring clips 98 on the outermost end of each rod 28.

Figure 6:
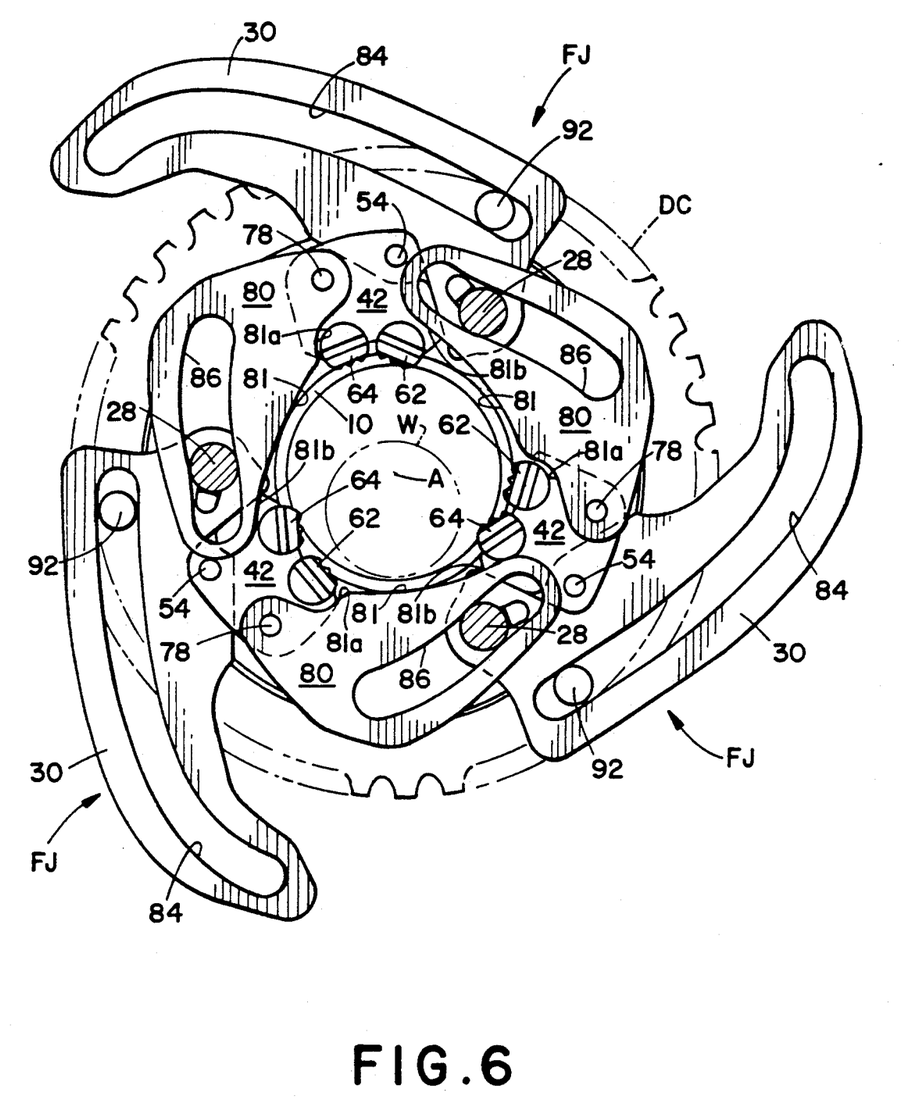
FIG. 6 is a sectional elevation view of the chuck taken along line 6—6 in FIG. 1 and showing the jaws in the open positions thereof.
Figure 7:
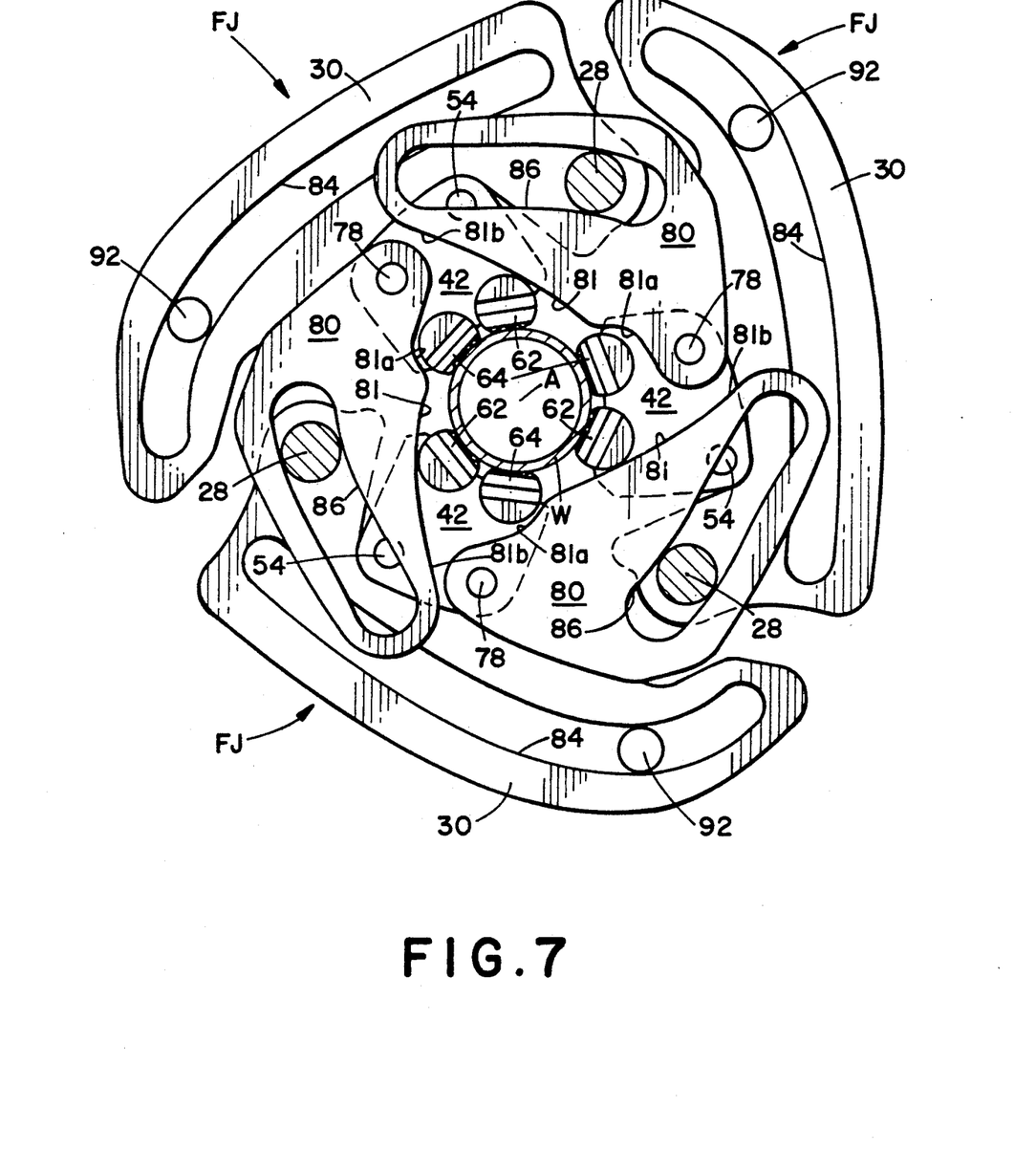
FIG. 7 is an end elevation view of the chuck similar to FIG. 6 and showing the chuck jaws in the closed positions thereof.

With regard now to the operation of the chuck, a plastic coated workpiece W to be threaded is introduced through spindle tube 10 with the front and rear jaw units in the open positions thereof such as shown in FIG. 6 with regard to the front jaw units FJ, whereby the workpiece rests on the bottom of the spindle tube The drive mechanism for the machine is then operated in the direction to cause pivotal closure of the front and rear jaw members relative to machine axis A which, as will be appreciated from FIGS. 6 and 7, is counterclockwise about the axes of the jaw rods 28 in the latter Figures. Accordingly, such displacement of the jaw members is achieved by rotating drive collar DC counterclockwise in FIGS. 6 and 7. As mentioned hereinabove, bearing 24 supports drive collar DC for pivotal displacement relative to the spindle tube, whereby it will be appreciated that initial displacement of the drive collar and pins 92 mounted thereon causes the front jaw members 30 to pivot counterclockwise about the axes of jaw rods 28 and thus radially inwardly of axis A as pins 92 move along cam slots 84 in the jaw members. To assure such initial relative displacement between the jaw members and spindle tube, the drag brake arrangement 22 restrains rotation of the spindle. Furthermore, as will be appreciated from the foregoing description, pivotal displacement of the front jaw members 30 in the foregoing manner pivots jaw rods 28 to in turn pivot the rear jaw members 31 and centering fingers 31a radially inwardly of axis A.

As the front and rear jaw members pivot in the direction of jaw closure relative to workpiece W, the centering finger components 31a on the rear jaws and the surfaces 81 on centering links 80 of the front jaw unit progressively converge relative to axis A and, in doing so, cooperate with workpiece engaging members 42 to cradle and displace workpiece W into position concentric with axis A. With regard to the front jaw units, it is believed that the latter will be apparent from FIGS. 6 and 7 respectively showing the jaws in the opened and closed positions relative to workpiece W. More particularly in this respect, as pins 92 move along cam slots 84 in jaw members 30 to pivot the latter counterclockwise about the axis of the corresponding rod 28, the corresponding workpiece engaging member 42 pivots counterclockwise with the jaw member and radially inwardly toward axis A. This displacement of member 42 causes the centering link 80 which is pivotally attached thereto to be displaced counterclockwise relative to the succeeding jaw rod 28 which is received in cam slot 86 of the centering link. The profile of cam slot 86 is such that displacement of the centering link relative to rod 28 causes the inner edge 81 of the link to progressively converge toward axis A whereby the inner edges 81 of the three centering links engage and roll workpiece W such that the workpiece is cradled between the inner edges and progressively displaced to a position coaxial with axis A and in which position the workpiece is engaged by the inserts 62 and 64 of the three workpiece engaging members 42 as shown in FIG. 7. During such displacement of workpiece W to a position coaxial with axis A, the shoulder 81a of each centering link is capable of engaging the outwardly projecting end of workpiece engaging insert 64 of the workpiece engaging member 42 to which the centering link is pivotally attached by pin 78. Such engagement will occur if member 42 pivots clockwise about pin 54 in FIG. 6 during jaw closure. Also during such displacement of the workpiece, edge 81 from end 81b of each centering link toward end 81a is capable of engaging the outwardly projecting end of insert 62 of the workpiece engaging member 42 pivotally attached to the succeeding jaw member 30 in the counterclockwise direction in FIGS. 6 and 7. The latter engagement will occur if member 42 pivots counterclockwise about pin 54 in FIG. 6 during jaw closure. Thus, the edges 81 and ends 81a of adjacent link members 80 cooperatively provide a pocket about the projecting ends of inserts 62 and 64 which limits pivotal movement of the corresponding workpiece engaging member relative to pin 54 and confines the workpiece engaging end of member 42 to move along a radial path relative to axis A during closing movement of the jaw members. Thus, the two inserts 62 and 64 engage the outer surface of the workpiece substantially simultaneously. Once the inserts of the workpiece engaging members engage the outer surface of workpiece W, the workpiece engaging members are self-centering through both the pivotal mounting thereof on the jaw members and the spring biased plunger arrangement which permits the inserts to pivot about their axes if and to the extent necessary to uniformly engage the outer surface of the workpiece. When the inserts of the three workpiece engaging members so engage the outer surface of the workpiece, edge 81 of each centering link radially engages against the projecting end of the associated insert 62 to lock the corresponding workpiece engaging member 42 against pivotal movement relative to the corresponding pin 54 during the ensuing threading operation, and the holding force is applied from drive pins 92 through the jaw members 30 directly to the corresponding workpiece engaging member 42 through pin 54.

When the workpiece is positioned concentrically with axis A and engaged by surfaces 62a and 64a of the inserts of the three workpiece engaging members 42, further rotation of drive collar DC and thus pins 92 relative to cam slots 84 of jaw members 30 is precluded, whereupon the braking effect of drag brake 22 is overcome and the drive collar is effective through pins 92 to drive the front jaw members and thus the spindle tube and workpiece W about axis A while a threading operation is performed on the workpiece. The location of pins 54 on jaw members 30 and the contour of cam slots 84 of the jaw members are such that for each different diameter of workpiece gripped in the foregoing manner the line of force from pin 92 through the corresponding workpiece engaging member 42 promotes a substantially equal distribution of the workpiece holding force between the two inserts. This, together with the area of engagement between surfaces 62a and 64a of the inserts and the outer surface of workpiece W and the indentation of the plastic coating by the teeth on the insert surfaces is such that threading can be achieved without slippage between the workpiece and workpiece engaging members and thus without circumferentially tearing or separating the plastic coating from the underlying metal workpiece. Furthermore, such gripping of the workpiece is achieved without radially penetrating the plastic coating to the outer surface of the underlying metal workpiece, whereby repairing of the plastic coating is not required following the threading operation. When the threading operation has been completed, the machine drive is stopped and reversed, whereby drive collar DC rotates clockwise in FIGS. 6 and 7 to displace pins 92 relative to jaw members 30 to pivot the latter clockwise about the axes of jaw rods 28 to return the jaws to the open positions thereof. In connection with such opening movement of the jaws, workpiece W is progressively lowered by the receding inner edges 81 of centering links 80 for engagement with the inner periphery of the spindle tube as shown in FIG. 6.

Figure 8:
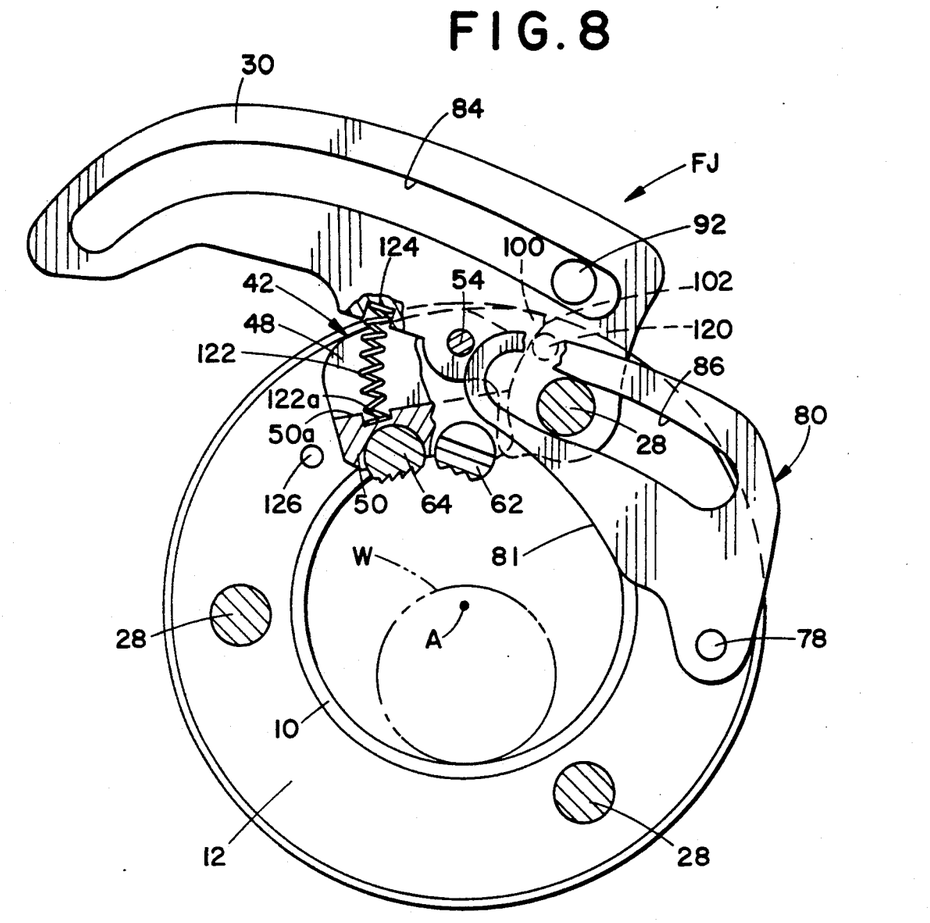
FIG. 8 is an elevation view, partially in section, showing a modification of the workpiece engaging member and guidance arrangement therefor, and showing the modification in conjunction with a chuck jaw in the open position.
Figure 9:
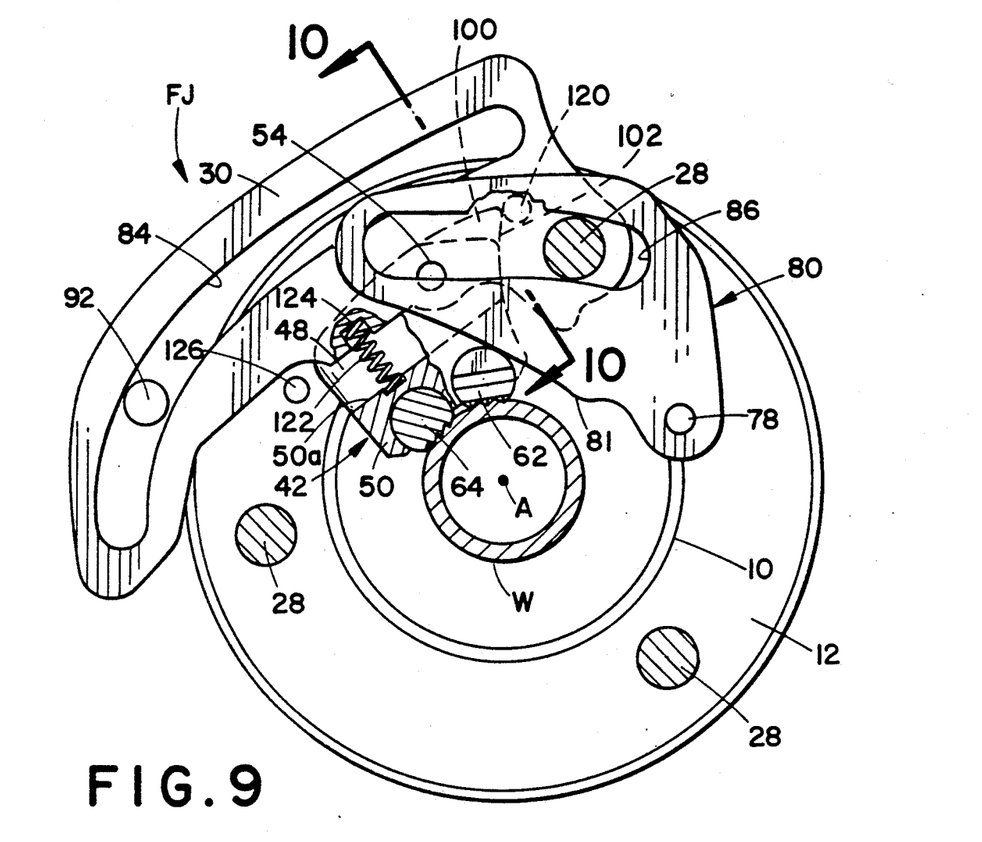
FIG. 9 is an elevation view, partially in section, similar to FIG. 8 and showing the chuck jaw in the closed position with respect to a workpiece.

FIGS. 8–13 illustrate a modification of the workpiece engaging member and the guidance arrangement by which the workpiece engaging end thereof is confined to move along a radial path relative to axis A during closing movement of the jaw members. These Figures also illustrate modifications of the inserts 62 and 64 with respect to the workpiece engaging surfaces and self-centering features thereof described hereinabove. The basic structure of the workpiece engaging members, the mounting thereof on jaw members 30 and the mounting and function of centering links 80 is substantially identical to that described hereinabove in connection with these components, whereby like numerals are employed in FIGS. 8–13 to designate component parts corresponding to those illustrated in FIGS. 1–7 and described hereinabove in conjunction therewith. While only one jaw member, workpiece engaging member and centering link are shown in FIGS. 8 and 9 of the drawing for purposes of clarity, it will be appreciated that the chuck assembly with the modifications of the workpiece engaging member would be comprised of three jaw units structurally interrelated as illustrated in FIGS. 6 and 7 of the drawing which correspond, respectively, with FIGS. 8 and 9 regarding the open and closed positions of the jaws.

Figure 4:
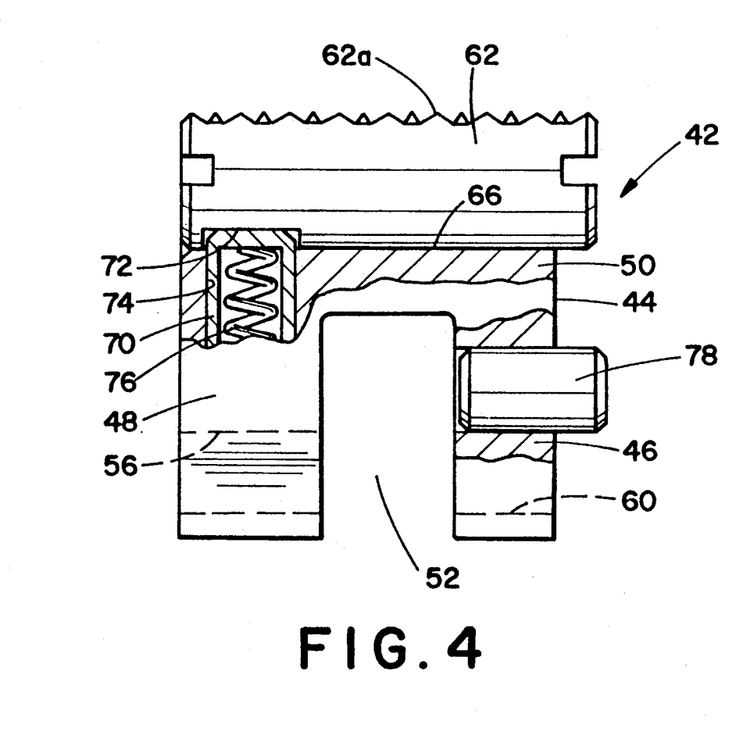
FIG. 4 is a side elevation view, partially in section, of the workpiece engaging member of the jaw unit.
Figure 5:
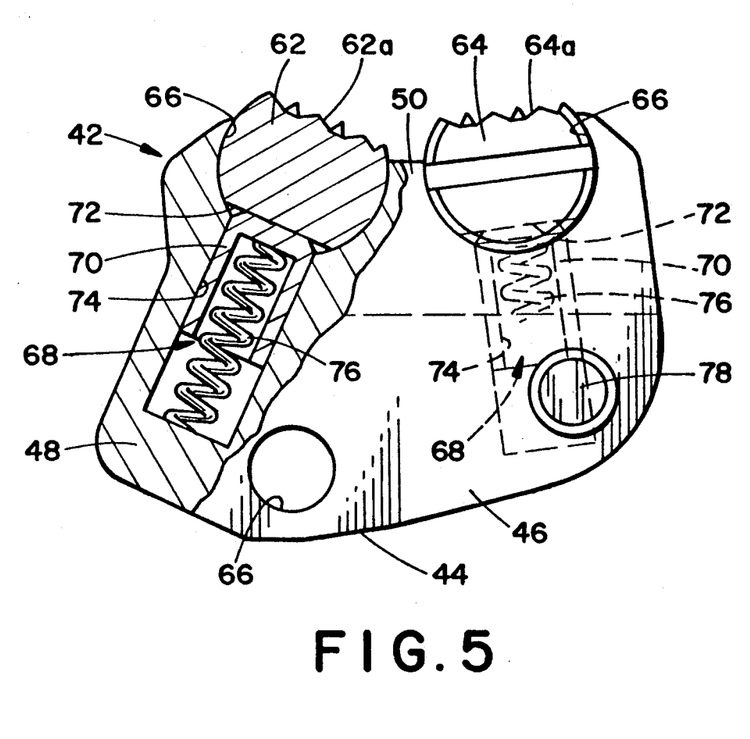
FIG. 5 is an end elevation view, partially in section, of the workpiece engaging member.
Figure 12:
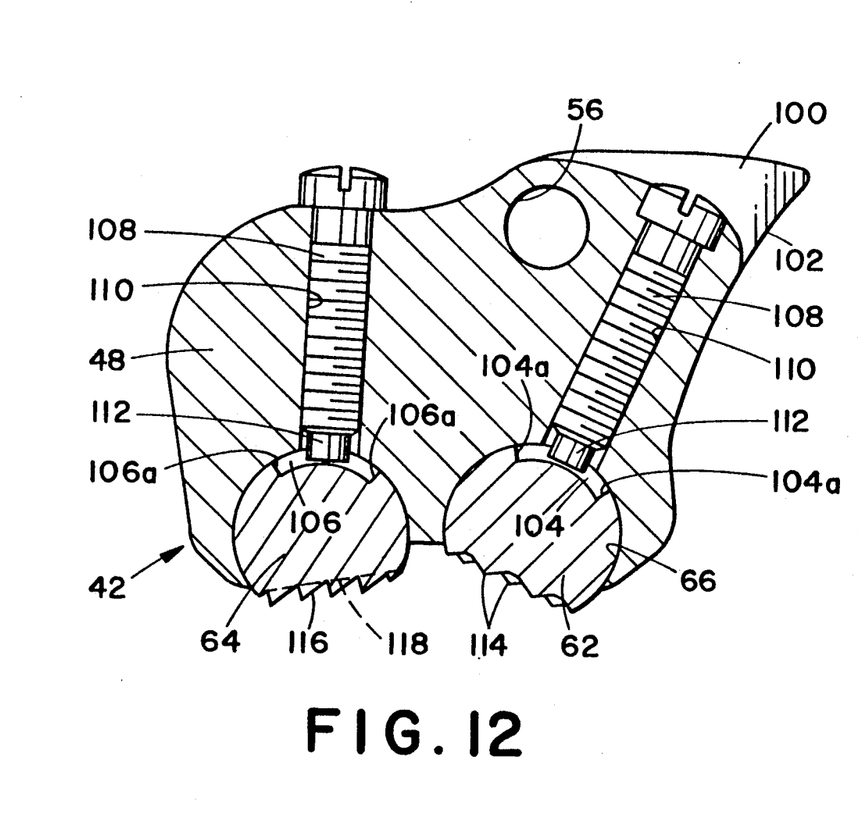
FIG. 12 is a sectional elevation view of the modified workpiece engaging member taken along line 12—12 in FIG. 11.

With reference to FIGS. 8–13, workpiece engaging member 42 as illustrated in the embodiment of FIGS. 4 and 5 of the drawing is structurally modified to provide leg 48 of insert holder 44 with a cam projection 100 having a cam surface 102 facing laterally outwardly of pin 54 by which the insert holder is pivotally mounted on jaw member 30. The insert holder is further modified by replacing flats 72 of inserts 62 and 64 with arcuate recesses 104 and 106, respectively, and by replacing the spring biased plungers 70 and springs 76 with a corresponding threaded screw 108 received in a corresponding threaded bore 110 and having a plain inner end 112 of reduced diameter received in the corresponding one of the recesses 104 and 106. Ends 112 of screws 108 are slidably received in recesses 104 and 106 and interengage therewith to retain the corresponding one of the inserts 62 and 64 against axial separation from insert holder 44. Further, each of the recesses 104 and 106 has corresponding circumferentially opposite ends 104a and 106a, as shown in FIG. 12, adapted to engage the corresponding screw end 112 to limit rotation of the corresponding insert about its axis relative to the corresponding insert channel 66. This arrangement advantageously provides for the inserts to float in channels 66 with respect to rotation of the inserts about their axes and facilitates the rotative displacement of the toothed outer surfaces of the inserts into facial engaging relationship with the workpiece upon closure of the chuck jaws. Further in this respect, if it is necessary for the inserts to rotate relative to the surface of the workpiece to achieve facial engagement therewith such rotation occurs without having to overcome the resistance to rotation provided by the spring biased plungers in the embodiment described hereinabove. Still further, by limiting rotation of the inserts in channels 66 by engagement of the ends of recesses 104 and 106 with the corresponding screw end 112 the inserts cannot rotate to an extent which could result in the insert dropping out of the open upper side of channels 66. In this respect, for example, if the diametrical distance between the toothed outer ends of the inserts and the opposite sides thereof is less than the distance across the open outer ends above channels 66, such dropping out would be possible. Precluding the latter advantageously enables such a diametrical relationship to be used, thus optimizing the available area on the outer ends of the inserts for teeth and thus the surface area of engagement between the outer ends of the inserts and the outer surface of a workpiece.

Figure 13:
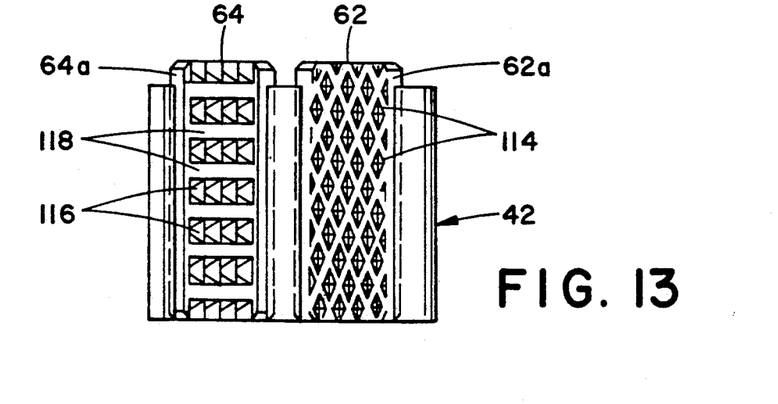
FIG. 13 is a plan view showing the tooth profiles of the inserts of the modified workpiece engaging member.

A further modification of the insert holder with respect to the embodiment thereof illustrated in FIGS. 4 and 5 of the drawing is the provision of different tooth profiles on the toothed outer ends 62a and 64a of the inserts 62 and 64, respectively. More particularly in this respect, as best seen in FIGS. 12 and 13 of the drawing, the profiles of teeth 114 on outer surface 62a of insert 62 are of diamond configuration when viewed perpendicular to the surface and are of pyramidal configuration when viewed horizontally as in FIG. 12. As will be appreciated from FIGS. 4 and 5 of the drawing, this is the toothed configuration of both inserts 62 and 64 in the embodiment therein illustrated. In accordance with the present embodiment, the profiles of teeth 116 on outer surface 64a of insert 64 are of sawtooth configuration when viewed horizontally as in FIG. 12 and of triangular configuration when viewed perpendicular to the surface as in FIG. 13. Further, whereas the pyramidal teeth 114 on insert 62 are in a criss-cross pattern relative to the axis of the insert which provides axially adjacent rows transverse to the insert axis in which the teeth axially overlap, the teeth 116 of insert 64 are in rows transverse to the insert axis and axially spaced apart by flat areas 118 therebetween. As will become apparent hereinafter, insert 64 is on the leading side of workpiece engaging member 42 with respect to the direction of rotation of jaw members 30 during closure thereof relative to a workpiece, and the sawtooth profile of teeth 116 promotes immediate gripping interengagement with the outer surface of the workpiece to preclude slippage relative thereto.

With reference to FIGS. 8 and 9 of the drawing, respectively showing jaw member 30 in its fully open position and in its closed position relative to a workpiece W, it will be appreciated that workpiece engaging member 42 is pivotally mounted on jaw 30 by pin 54 as described hereinbefore for pivotal movement with jaw 30 about the axis of jaw rod 28 in response to displacement of drive pin 92 counterclockwise as described hereinabove in connection with the embodiment illustrated in FIGS. 1-7 of the drawing. As further described in connection with the latter embodiment, jaw rods 28 are pivotally supported in openings therefore in spindle collar 12, whereby it will be appreciated that displacement of drive pin 92 counterclockwise in FIG. 8 pivots jaw 30 counterclockwise about the axis of rod 28 to displace workpiece engaging member 42 radially inwardly towards axis A of the chuck for engagement with a workpiece resting in the spindle tube 10.

In the embodiment illustrated in FIGS. 8 and 9, workpiece engaging member 42 is constrained to move along a radial path toward and away from axis A during closing and opening of the jaw in a manner different from that described hereinabove in connection with the embodiment of FIGS. 1-7. In this respect, spindle plate 12 is provided with a pin 120 circumferentially spaced from rod 28 of the corresponding jaw 30 in the forward direction with respect to the direction of rotation of drive pin 92 by which jaw 30 is displaced in the closing direction thereof. Accordingly, it will be appreciated that pin 120 is fixed relative to jaw rod 28, and it will be further appreciated from FIGS. 1 and 10 of the drawing that pin 120 extends axially outwardly from spindle plate 12 behind jaw 30 and into the path of leg 48 of workpiece engaging member 42 which is disposed between jaw 30 and spindle sleeve 12. Further, as shown in FIG. 8, pin 120 engages cam surface 102 of cam 100 on leg 48 of the workpiece holder. Cam surface 102 is profiled to interengage with pin 120 during closing movement of jaw 30 to maintain the axially outer end of insert 62 in engagement with edge 81 of centering link 80. Accordingly, as drive pin 92 moves from the position shown in FIG. 8 to the position shown in FIG. 9 to displace jaw 30 and workpiece engaging member 42 radially inwardly of axis A for engagement with workpiece W which is centered relative to axis A as described herein, pivotal movement of jaw member 30 about the axis of rod 28 displaces workpiece engaging member 42 therewith about the axis of rod 28 and moves cam surface 102 relative to pin 120. Engagement between pin 120 and cam surface 102 biases workpiece engaging member 42 counterclockwise about pin 54 to maintain the outer end of insert 62 in engagement with centering link 80 which is pivotally displaced about its mounting pin 78 during such closing movement of the jaw as described herein in connection with the embodiment in FIGS. 1-7. This interengaging relationship between insert 62 and edge 81 of centering plate 80 advantageously precludes any rocking movement of workpiece holder 42 relative to pin 54 during closing movement of the jaw and provides positive guidance of the workpiece engaging member relative to axis A. This in turn promotes the toothed outer surfaces of both inserts 62 and 64 engaging the outer surface of the workpiece at the same time to preclude slippage therebetween. Slippage is further precluded by the penetrating effect of the sawtooth configuration of the teeth 116 on lead insert 64. It will be further appreciated from the foregoing description that displacement of jaw 30 from the closed position shown in FIG. 9 to the open position shown in FIG. 8 results in the same positive guidance of workpiece engaging member 42 radially outwardly of axis A by pin 120 and cam surface 102.

Figure 10:
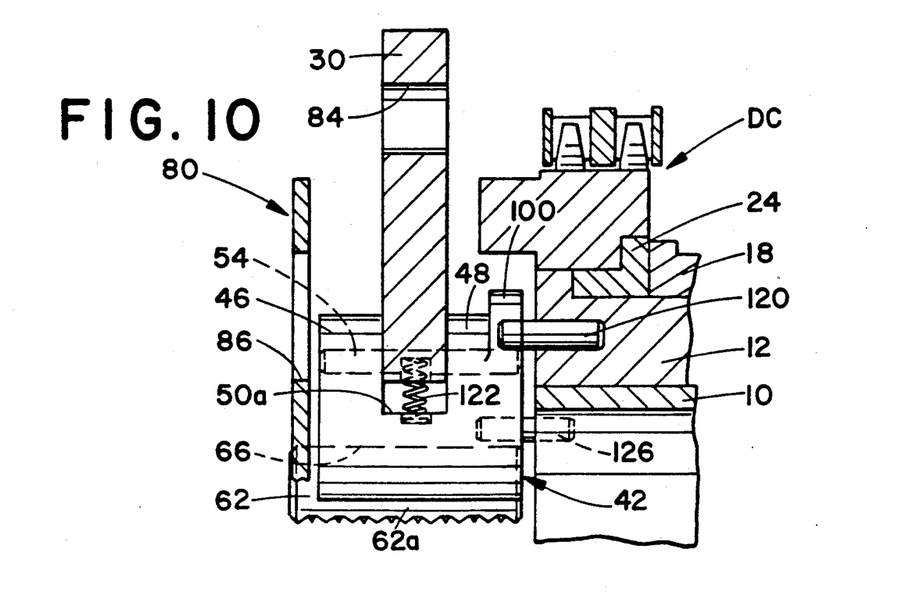
FIG. 10 is a sectional view taken along line 10—10 in FIG. 9.
Figure 11:
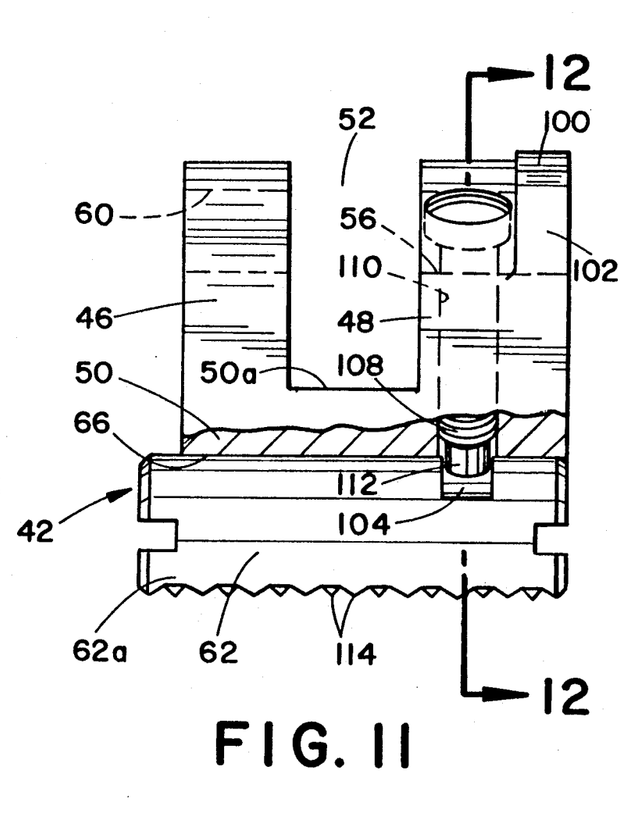
FIG. 11 is an elevation view, partially in section, showing the modified workpiece engaging member.

In FIG. 9, workpiece W is of a diameter which provides for the outermost end of cam surface 102 to engage pin 120. If the workpiece to be engaged is of smaller diameter than that shown in FIG. 9, it will be appreciated that further displacement of workpiece engaging member 42 radially inwardly of axis A will displace cam surface 102 from engagement with pin 120. In the embodiment illustrated, further guidance for the workpiece engaging member in the latter situation to maintain the outer end of insert 62 against edge 81 of centering link 80 during closing movement is provided by a coil spring 122 suitably secured in a recess 124 in jaw member 30 for displacement therewith. Spring 122 has an outer end 122a engaging against inner surface 50a of bridging portion 50 of the workpiece insert. When cam surface 102 disengages with pin 120 spring 122 is compressed to the position shown in FIG. 9 and engages inner surface 50a of bridging portion 50 to bias the workpiece engaging member counterclockwise about pin 54, thus to maintain the outer end of insert 62 engaged against edge 81 of centering link 80. In connection with the opening movement of the jaws from gripping relationship with such a small diameter workpiece, it is preferred to preclude the possibility of the workpiece engaging and displacing the member 42 clockwise about pin 54 before the component parts reach the position shown in FIG. 9. It will be appreciated that such clockwise displacement of member 42 would result in cam 100 being radially under pin 120 and thus out of position for cam surface 102 to engage with the pin. While spring 122, if of sufficient force, could provide the desired assurance against such displacement of member 42, it is preferred to provide a return pin 126 on spindle plate 12 positioned relative to member 42 as shown in FIGS. 8-10 to positively stop clockwise movement thereof.

While considerable emphasis has been placed herein on the structures and structural interrelationships between the component parts of the preferred embodiments, it will be appreciated that other embodiments can be devised and that many modifications can be made in the preferred embodiments without departing from the principles of the present invention. In particular, it will be appreciated that the structural features of the two embodiments of the workpiece holder and the guidance thereof can be interchanged. Further other jaw mounting and drive arrangements can be provided for pivotally supporting and displacing the jaw members between the open and closed positions thereof relative to a workpiece, and the workpiece engaging members 42 can have a single inner surface for engaging a workpiece as opposed to an inner surface defined by two inserts as illustrated and described herein. The latter arrangement is preferred in that it accommodates a larger number of different diameter workpieces than could be accommodated with a single surface providing an equivalent area of contact with the outer surface of the workpiece. Moreover, while the ends and/or inner edges 81 of the centering links 80 engage the outwardly projecting ends of inserts 64 and/or to maintain the desired orientation of the workpiece engaging members 42 relative to axis A during closing of the jaw members, the links and workpiece engaging members could be provided with other interengaging arrangements for this purpose, such as pins or other projections on the members 42 for engagement with the centering links. Also, while the chuck assembly is particularly suited for gripping and rotating plastic coated workpieces, it is capable of gripping and rotating metal workpieces as well. The foregoing and other modifications as well as other embodiments of the invention will be suggested to those skilled in the art upon reading the foregoing description of the preferred embodiment, whereby it is to be distinctly understood that the foregoing descriptive matter is to be interpreted merely as illustrative of the invention and not as a limitation.

Having thus described the invention, it is claimed:

1. In a workpiece chuck having a first axis and including tubular support means having a workpiece receiving opening coaxial with said first axis, a plurality of jaws circumferentially spaced apart about said first axis, means supporting each said jaw on said tubular support means for pivotal movement inwardly and outwardly of said first axis about a corresponding jaw axis parallel to said first axis and radially and circumferentially fixed relative to said tubular support means, each said jaw including workpiece engaging means, and means to pivot said jaws about said jaw axes, the improvement comprising: each said workpiece engaging means being mounted on the corresponding jaw for displacement therewith about said corresponding jaw axis and for pivotal displacement relative thereto about a second axis parallel to said corresponding jaw axis, each said workpiece engaging means having workpiece engaging end means facing said first axis, and means to position said workpiece engaging means relative to said second axes during pivotal movement of said jaws inwardly and outwardly of said first axis to confine each said workpiece engaging end means to move along a radial path toward said first axis.

2. A workpiece chuck according to claim 1, wherein said jaws are adjacent with respect to a given direction about said first axis, said means to position said workpiece engaging means including a plurality of link means corresponding in number to the number of jaws, each said link means having opposite ends, one of said opposite ends being pivotally interconnected with a different one of said workpiece engaging means at a third axis parallel to said second axis thereof, and each said link means being supported for slidable displacement relative to the jaw axis of the succeeding adjacent jaw in said given direction with respect to the jaw on which said different one of said workpiece engaging means is mounted.

3. A workpiece chuck according to claim 2, wherein said workpiece engaging means include means providing surfaces engaged by said link means to limit pivotal displacement of said workpiece engaging means relative to said second axes.

4. A workpiece chuck according to claim 3, wherein said means providing surfaces engaged by said link means includes means providing each of said workpiece engaging means with two surfaces, one of said surfaces being engaged, by said one end of the link means pivotally interconnected with the workpiece engaging means and the other of said surfaces being engaged by the other of said opposite ends of the link means pivotally interconnected with the workpiece engaging means on the preceding adjacent jaw with respect to said given direction.

5. A workpiece chuck according to claim 4, wherein each said workpiece engaging means includes holder means and said workpiece engaging end means includes first and second insert means circumferentially spaced apart on said holder means with respect to said first axis, said first and second insert means having ends respectively providing said one and the other of said two surfaces.

6. A workpiece chuck according to claim 5, wherein each said first and second insert means is supported in the corresponding holder means for pivotal displacement about a corresponding insert axis parallel to said first axis and includes surface means parallel to said insert axis and facing said first axis.

7. A workpiece chuck according to claim 6, wherein each said first and second insert means is pivotal about said corresponding insert axis relative to a neutral position with respect to said holder means, and means biasing said first and second insert means toward said neutral position.

8. A workpiece chuck according to claim 1, wherein said jaws are adjacent with respect to a given direction about said first axis and said tubular support means has an end, said means supporting each said jaw on said tubular support means including corresponding rod means extending outwardly of said end and providing said jaw axes, said jaws being received on said rod means, said means to position said workpiece engaging means including link members corresponding in number to the number of jaws, each link member having opposite ends, one of said opposite ends of each link member being pivotally interconnected with a different one of said workpiece engaging means at a third axis, and each said link member having a slot between said one and the other of said opposite ends slidably receiving the rod means of the succeeding adjacent jaw in said given direction with respect to the jaw on which said different one of said workpiece engaging means is mounted.

9. A workpiece chuck according to claim 8, wherein each said link member has edge means between said opposite ends facing inwardly toward said first axis and each said workpiece engaging means includes means providing two surfaces engaged by said edge means of said link members to limit pivotal displacement of said workpiece engaging means relative to said second axis, one of said two surfaces engaging with said edge means adjacent said one end of the link member pivotally interconnected with the workpiece engaging means, and the other of said two surfaces engaging with said edge means adjacent the other of said opposite ends of the link member pivotally interconnected with the workpiece engaging means on the preceding adjacent jaw with respect to said given direction.

10. A workpiece chuck according to claim 9, wherein said opening in said tubular support means has an inner periphery and said jaws pivot inwardly and outwardly between closed and open positions, said workpiece engaging means in said closed positions being adapted to support a workpiece in said opening in a centered position coaxial with said first axis, said workpiece in said open positions of said jaws being in a resting position against said inner periphery of said opening, and said edge means between said opposite ends of said link members engaging and displacing said workpiece from said resting to said central position during pivotal movement of said jaws from said open to said closed positions thereof.

11. A workpiece chuck according to claim 9, wherein each said workpiece engaging means includes holder means and said workpiece engaging end means includes first and second insert means circumferentially spaced apart on said holder means, said first and second insert means having ends respectively providing said one and the other of said two surfaces.

12. A workpiece chuck according to claim 11, wherein each said first and second insert means is supported in the corresponding holder means for pivotal displacement about a corresponding insert axis parallel to said first axis and includes surface means parallel to said insert axis and facing said first axis.

13. A workpiece chuck according to claim 12, wherein each said first and second insert means is pivotal about said corresponding insert axis relative to a neutral position with respect to said holder means, and means biasing said first and second insert means toward said neutral position.

14. A workpiece chuck according to claim 13, wherein said opening in said tubular support means has an inner periphery and said jaws pivot inwardly and outwardly between closed and open positions, said workpiece engaging means in said closed positions being adapted to support a workpiece in said opening in a centered position coaxial with said first axis, said workpiece in said open positions of said jaws being in a resting position against said inner periphery of said opening, and said edge means between said opposite ends of said link members engaging and displacing said workpiece from said resting to said central position during pivotal movement of said jaws from said open to said closed positions thereof.

15. A workpiece chuck according to claim 1, wherein said jaws are adjacent with respect to a given direction about said first axis, said means to position said workpiece engaging means including a plurality of link means corresponding in number to the number of jaws, each said link means having opposite ends, one of said opposite ends being pivotally interconnected with a different one of said workpiece engaging means at a third axis parallel to said second axis thereof, each said link means being supported for slidable displacement relative to the jaw axis of the succeeding adjacent jaw in said given direction with respect to the jaw on which said different one of said workpiece engaging means is mounted, said workpiece engaging means including means providing surface means engaged by said link means to limit pivotal displacement of said workpiece engaging means relative to said second axes, and means to bias said workpiece engaging means for said surface means to engage said link means.

16. A workpiece chuck according to claim 15, wherein said means to bias said workpiece engaging means includes, for each said workpiece engaging means, pin means on said tubular support means and cam surface means on said workpiece engaging means and slidably interengaging said pin means.

17. A workpiece chuck according to claim 15, wherein said means to bias said workpiece engaging means includes biasing spring means between each said jaw and the corresponding workpiece engaging means.

18. A workpiece chuck according to claim 17, wherein said means to bias said workpiece engaging means includes, for each said workpiece engaging means, pin means on said tubular support means and cam surface means on said workpiece engaging means and slidably interengaging said pin means.

19. A workpiece chuck according to claim 1, wherein each said workpiece engaging end means includes first and second insert means circumferentially spaced apart on said holder means with respect to said first axis, each said first and second insert means being supported in the corresponding holder means for pivotal displacement about a corresponding insert axis parallel to said first axis and including toothed surface means parallel to said insert axis and facing said first axis, and means to limit pivotal displacement of each said insert means about its insert axis.

20. A workpiece chuck according to claim 19, wherein said means to limit pivotal displacement of each said insert means includes circumferentially extending recess means in said insert means and pin means on said holder means and received in said recess means.

21. A workpiece chuck according to claim 19, wherein said jaws are adjacent with respect to a given direction about said first axis, said means to position said workpiece engaging means including a plurality of link means corresponding in number to the number of jaws, each said link means having opposite ends, one of said opposite ends being pivotally interconnected with a different one of said workpiece engaging means at a third axis parallel to said second axis thereof, each said link means being supported for slidable displacement relative to the jaw axis of the succeeding adjacent jaw in said given direction with respect to the jaw on which said different one of said workpiece engaging means is mounted, said workpiece engaging means including means providing surface means engaged by said link means to limit pivotal displacement of said workpiece engaging means relative to said second axes, and means to bias said workpiece engaging means for said surface means to engage said link means.

22. A workpiece chuck according to claim 21, wherein said means to bias said workpiece engaging means includes, for each said workpiece engaging means, pin means on said tubular support means and cam surface means on said workpiece engaging means and slidably interengaging said pin means.

23. A workpiece chuck according to claim 22, wherein said means to bias said workpiece engaging means includes biasing spring means between each said jaw and the corresponding workpieces engaging means.

24. A workpiece chuck according to claim 23, wherein said means to limit pivotal displacement of each said insert means includes circumferentially extending recess means in said insert means and pin means on said holder means and received in said recess means.

25. A workpiece chuck according to claim 21, wherein one of said first and second insert means has an end providing said surface means engaged by said link means.

26. A workpiece chuck according to claim 15, wherein each said workpiece engaging means includes holder means and said workpiece engaging end means includes first and second insert means circumferentially spaced apart on said holder means with respect to said first axis, one of said first and second insert means having an end providing said surface means engaged by said link means.

27. A workpiece chuck according to claim 26, wherein said means to bias said workpiece engaging means includes, for each said workpiece engaging means, pin means on said tubular support means and cam surface means on said workpiece engaging means and slidably interengaging said pin means.

28. A workpiece chuck according to claim 27, wherein said means to bias said workpiece engaging means includes biasing spring means between each said jaw and the corresponding workpiece engaging means.

29. A workpiece chuck according to claim 1, wherein each said workpiece engaging means includes holder means and said workpiece engaging end means includes first and second insert means circumferentially spaced apart on said holder means with respect to said first axis, each said first and second insert means being supported in the corresponding holder means for pivotal displacement about a corresponding insert axis parallel to said first axis and including toothed surface means parallel to said insert axis and facing said first axis.

30. A workpiece chuck according to claim 29, wherein said toothed surface means of said first insert means includes a plurality of rows of teeth of sawtooth profile extending transverse to the corresponding insert axis.

31. A workpiece chuck according to claim 30, wherein the toothed surface means of said second insert means includes a plurality of rows of teeth of pyramidal profile extending at an oblique angle to the corresponding insert axis.

32. A workpiece chuck according to claim 31, wherein said jaws are adjacent with respect to a given direction about said first axis, said means to position said workpiece engaging means including a plurality of link means corresponding in number to the number of jaws, each said link means having opposite ends, one of said opposite ends being pivotally interconnected with a different one of said workpiece engaging means at a third axis parallel to said second axis thereof, each said link means being supported for slidable displacement relative to the jaw axis of the succeeding adjacent jaw in said given direction with respect to the jaw on which said different one of said workpiece engaging means is mounted, said workpiece engaging means including means providing surface means engaged by said link means to limit pivotal displacement of said workpiece engaging means relative to said second axes, and means to bias said workpiece engaging means for said surface means to engage said link means.

33. A workpiece chuck according to claim 31, wherein one of said first and second insert means has an end providing said surface means engaged by said link means.

34. A workpiece chuck according to claim 33, wherein said means to bias said workpiece engaging means includes, for each said workpiece engaging means, pin means on said tubular support means and cam surface means on said workpiece engaging means and slidably interengaging said pin means.

35. A workpiece chuck according to claim 34, wherein said means to bias said workpiece engaging means includes biasing spring means between each said jaw and the corresponding workpiece engaging means.

36. A workpiece chuck according to claim 35, and further comprising return pin means on said tubular support means to restrain pivotal movement of said workpiece engaging means relative to said second axis in the direction to displace said cam surface means from said pin means.

37. A workpiece chuck according to claim 16, and further comprising return pin means on said tubular support means to restrain pivotal movement of said workpiece engaging means relative to said second axis in the direction to displace said cam surface means from said pin means.

38. A workpiece chuck according to claim 22, and further comprising return pin means on said tubular support means to restrain pivotal movement of said workpiece engaging means relative to said second axis in the direction to displace said cam surface means from said pin means.

39. A workpiece chuck according to claim 27, and further comprising return pin means on said tubular support means to restrain pivotal movement of said workpiece engaging means relative to said second axis in the direction to displace said cam surface means from said pin means.

* * * * *

UNITED STATES PATENT AND TRADEMARK OFFICE
CERTIFICATE OF CORRECTION

PATENT NO. : 5,074,176

DATED : December 24, 1991

INVENTOR(S) : James C. Redman and Michael R. Sanner

It is certified that error appears in the above-identified patent and that said Letters Patent is hereby corrected as shown below:

Column 14, line 20, delete the comma following "engaged".

Signed and Sealed this

Nineteenth Day of April, 1994

Attest:

BRUCE LEHMAN

*Attesting Officer*     *Commissioner of Patents and Trademarks*